W. P. HAYES.
CUSPIDOR.
APPLICATION FILED APR. 24, 1914.
1,148,897.
Patented Aug. 3, 1915.
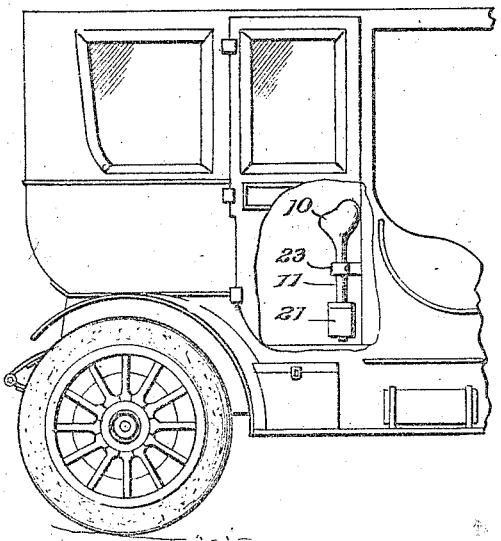
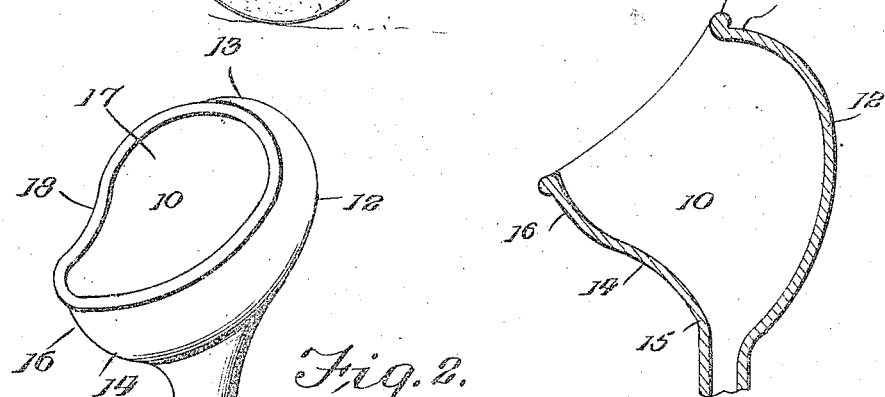
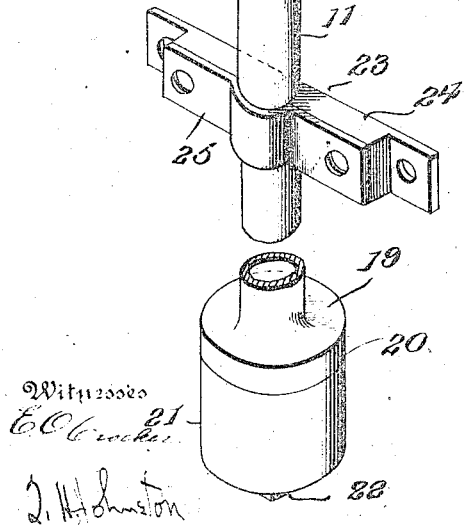
Inventor
Wm. P. Hayes.
Witnesses
By
Attorneys

UNITED STATES PATENT OFFICE.

WILLIAM P. HAYES, OF MILLER, SOUTH DAKOTA.

CUSPIDOR.

1,148,897. Specification of Letters Patent. Patented Aug. 3, 1915.

Application filed April 24, 1914. Serial No. 834,162.

*To all whom it may concern:*

Be it known that I, WILLIAM P. HAYES, citizen of the United States, residing at Miller, in the county of Hand and State of South Dakota, have invented certain new and useful Improvements in Cuspidors, of which the following is a specification.

This invention relates to cuspidors especially designed for use in automobiles and aims to provide a device of this character particularly adapted for attachment within the closed type of automobile or limousine.

A further object of the invention is to provide a cuspidor which may be readily attached, and which is so constructed that the contents thereof will be positively prevented from spilling.

The invention has as a further object to provide a cuspidor including a peculiarly shaped bowl provided with a neck, the bowl being so formed as to not only prevent spattering of sputum directed into the bowl exteriorly thereof, but will at the same time, direct such sputum immediately into the neck of the cuspidor which neck carries at its lower extremity a detachably connected receptacle which may be readily removed for cleaning. And a still further object of the invention is to provide a cuspidor which will not present an unsightly appearance and which will be simple in construction and which may thus be readily manufactured and placed upon the market.

With these and other objects in view my invention will be more fully described, illustrated in the accompanying drawings, and then specifically pointed out in the claim which is attached to and forms a part of this application.

In the accompanying drawings: Figure 1 is a perspective view partly broken away showing my improved cuspidor in position within an automobile, the portion of the automobile illustrated being conventionally shown, Fig. 2 is a detail perspective view of the cuspidor, this view also showing the support therefor, and Fig. 3 is a vertical sectional view showing the manner in which the receptacle is connected to the neck of the bowl.

Corresponding and like parts are referred to in the following description and indicated in all the views of the drawings by the same reference characters.

My improved cuspidor may be formed of metal, porcelain, or any other suitable material and preferably includes a substantially ovate bowl 10, the walls of which converge at the inner extremity of the bowl to provide a restricted neck portion 11, which is preferably circular in cross-section and which communicates with the bowl. The rear wall 12 of the bowl is continuously curved from the upper extremity of the neck 11, and is extended forwardly at its upper extremity as shown at 13, terminating at its free edge substantially in alinement with the inner extremity of the forward wall 14 of the bowl at the point where it merges into the neck 11, the wall 12 presenting a concave inner face. The forward wall 14 of the bowl preferably merges into the neck 11 as shown at 15 above the point where the rear wall 12 merges into said neck, and said wall 14 is curved outwardly and upwardly away from the rear wall 12, and is longitudinally bowed adjacent its upper extremity as shown at 16, the free extremity of said wall being curved inwardly toward the free extremity of the wall 12.

The bowl 10 is provided with a suitable opening 17, preferably surrounded by a bead 18 formed on the bowl, the edges of said opening being inclined upwardly from the free extremity of the wall 14 to the free extremity of the wall 12. By this construction it will be observed that foreign matter coming within the bowl and striking the wall 14 will be immediately directed into the neck 11. Particular attention is called to the peculiar formation and the relative disposition of the rear wall 12 of the bowl, such wall presenting a concave inner face and being extended at its upper extremity above and over the neck 11. Owing to this peculiar formation of the wall 12 and the curvature thereof, foreign matter striking such wall will not be permitted to spatter exteriorly of the bowl, the inner face of said wall acting to direct such matter downwardly toward the neck 11, any foreign matter coming against the inner face of the wall and having a tendency to spatter being retained by the portion 13 of said wall by which such matter is directed inwardly of the bowl. Particular attention is also called to the construction whereby the rear wall 12 merges with the walls of the neck 11 below the point where the front wall 14 merges with such wall of the neck. By this arrangement sputum or other foreign matter is prevented from collecting immediately at the point where the walls of the bowl merge into the walls of the neck, where it could readily be observed and would present a very unsightly appearance. This is an especial feature of advantage in my invention since the cuspidor is especially designed for use in an expensive type of automobile and it is highly desirable that the device have no such objectionable feature.

At the lower extremity of the neck 11, the walls thereof are laterally enlarged to provide a preferably circular head 19 which is formed with an internally screw threaded depending peripheral flange 20. Engaging the head 19 is a preferably cylindrical receptacle 21, the upper extremities of the walls of said receptacle being externally screw threaded to engage the screw threads formed on the flange 20 of the head. The bottom wall of the receptacle 21 is preferably provided with an exteriorly disposed lug 22 which may be readily engaged by a wrench or other tool to disengage the receptacle 21 from the head 19 and it will be observed that the receptacle may be easily detached for cleaning by simply unscrewing it from the head 19 and may thus be kept in a sanitary condition.

My improved cuspidor is especially designed to be arranged within automobiles of the closed type, such as limousines and may be secured in any convenient position therein. In Fig. 1 of the drawings, I have shown the cuspidor as applied to the front wall of a limousine and in supporting the cuspidor, a bracket 23 is preferably employed, such bracket being formed in sections 24 and 25, the section 24 being secured to the wall of the vehicle in any suitable manner and being provided with a central recess adapted to receive the neck 11 of the cuspidor. The member 25 is preferably formed of a strip of suitable sheet metal longitudinally bowed intermediate its ends to embrace the neck 11, the strip 25 being detachably connected to the strip 24 and it will thus be observed that by this arrangement the cuspidor is not only firmly held in position but may be readily removed from the vehicle when desired.

From the foregoing description, it will therefore be apparent that I provide a very simple and efficient construction for the purpose set forth, such as may be readily placed within an automobile and wherein the receptacle of the cuspidor can easily be removed and thus kept in a sanitary condition. It will also be seen that I provide a very efficient construction of bowl for my improved cuspidor such as will not only prevent spattering or splashing, but is so formed as to at the same time prevent the collection of foreign or unsightly matter at the head of the neck of the cuspidor leading from the bowl.

Having thus described my invention what I claim and desire to secure by Letters Patent is:

In a receptacle of the class described, a bowl, a stem communicating at its upper end with the bowl and extending vertically downwardly from the bottom of the bowl and provided with a flared lower end interiorly threaded, and a receiving vessel provided with a threaded flange at its upper end removably fitted into the flared end of the neck, and a squared head upon the bottom of the said receiving vessel.

In testimony whereof I affix my signature in presence of two witnesses.

WILLIAM P. HAYES. [L. S.]

Witnesses:
G. E. RICHARDSON,
D. A. McCOY.